(12) United States Patent
Yamamoto et al.

(10) Patent No.: US 11,434,378 B2
(45) Date of Patent: Sep. 6, 2022

(54) BARIUM SULFATE POWDER AND RESIN COMPOSITION COMPRISING SAME

(71) Applicant: SAKAI CHEMICAL INDUSTRY CO., LTD., Sakai (JP)

(72) Inventors: Tsutomu Yamamoto, Fukushima (JP); Hironobu Ogata, Fukushima (JP); Hiroaki Hamamura, Fukushima (JP); Masayuki Asada, Fukushima (JP)

(73) Assignee: Sakai Chemical Industry Co., Ltd., Osaka (JP)

(*) Notice: Subject to any disclaimer, the term of this patent is extended or adjusted under 35 U.S.C. 154(b) by 0 days.

(21) Appl. No.: 16/341,280

(22) PCT Filed: Oct. 18, 2017

(86) PCT No.: PCT/JP2017/037701
§ 371 (c)(1),
(2) Date: Apr. 11, 2019

(87) PCT Pub. No.: WO2018/079378
PCT Pub. Date: May 3, 2018

(65) Prior Publication Data
US 2021/0139709 A1 May 13, 2021

(30) Foreign Application Priority Data
Oct. 28, 2016 (JP) .............................. JP2016-211656

(51) Int. Cl.
*C09C 3/12* (2006.01)
*C09C 1/00* (2006.01)
(Continued)

(52) U.S. Cl.
CPC ................. *C09C 3/12* (2013.01); *C08K 3/30* (2013.01); *C08K 9/04* (2013.01); *C08K 9/06* (2013.01);
(Continued)

(58) Field of Classification Search
CPC ........... C01F 11/462; C09C 1/027; C09C 3/12
See application file for complete search history.

(56) References Cited

U.S. PATENT DOCUMENTS

| | | | |
|---|---|---|---|
| 4,894,093 A | 1/1990 | Aderhold et al. | |
| 5,709,715 A * | 1/1998 | Guidotti | C03C 17/28 8/115.51 |

(Continued)

FOREIGN PATENT DOCUMENTS

| | | |
|---|---|---|
| CN | 88103235 | 12/1988 |
| CN | 1890179 | 1/2007 |

(Continued)

*Primary Examiner* — Alexandre F Ferre
(74) *Attorney, Agent, or Firm* — Hamre, Schumann, Mueller & Larson, P.C.

(57) ABSTRACT

The present invention relates to fine barium sulfate powder that can be readily and simply dispersed in resins or solvents; a resin composition, a coating composition, an ink composition, and a resin molded article each containing the barium sulfate powder; and a method for producing the barium sulfate powder. Provided is barium sulfate powder having a number average primary particle size of 1 to 100 nm, the powder including an organic compound on its surface, the powder in the form of compressed compact having a contact angle with distilled water of 10 to 170 degrees.

13 Claims, 8 Drawing Sheets

Comparative Example 1

(51) Int. Cl.
  C09C 3/08   (2006.01)
  C08K 9/06   (2006.01)
  C08K 9/04   (2006.01)
  C08K 3/30   (2006.01)
  C09D 7/62   (2018.01)
  C09D 7/40   (2018.01)

(52) U.S. Cl.
  CPC .................. C09C 1/00 (2013.01); C09C 3/08 (2013.01); C09D 7/62 (2018.01); C09D 7/67 (2018.01); *C01P 2004/03* (2013.01); *C01P 2004/64* (2013.01); *C08K 2003/3045* (2013.01); *C08K 2201/005* (2013.01); *C08K 2201/011* (2013.01)

(56) References Cited

U.S. PATENT DOCUMENTS

| | | | |
|---|---|---|---|
| 7,846,409 | B2 | 12/2010 | Hardinghaus et al. |
| 2001/0016202 | A1* | 8/2001 | Kanemaru ............... A61Q 1/06 424/401 |
| 2003/0159622 | A1 | 8/2003 | Amirzadeh-Asl et al. |
| 2004/0197262 | A1 | 10/2004 | Hardinghaus et al. |
| 2007/0140938 | A1 | 6/2007 | Stahl et al. |
| 2008/0314291 | A1 | 12/2008 | Grothe et al. |
| 2009/0318594 | A1* | 12/2009 | Grothe .................... C08K 9/02 524/148 |
| 2009/0326114 | A1 | 12/2009 | Grothe et al. |
| 2010/0162922 | A1 | 7/2010 | Ono et al. |
| 2015/0111992 | A1* | 4/2015 | Shimizu .................. C08K 9/02 523/453 |

FOREIGN PATENT DOCUMENTS

| | | |
|---|---|---|
| CN | 104411757 | 3/2015 |
| EP | 0 335 159 | 10/1989 |
| EP | 2 871 209 | 5/2015 |
| JP | 11-323167 | 11/1999 |
| JP | 2003-523914 | 8/2003 |
| JP | 2008-542492 | 11/2008 |
| JP | 2009-505808 | 2/2009 |
| JP | 2009-527452 | 7/2009 |
| JP | 2010-501708 | 1/2010 |
| JP | 2010-501709 | 1/2010 |
| WO | 2006/131492 | 12/2006 |
| WO | 2006/131500 | 12/2006 |
| WO | 2007/069353 | 6/2007 |

\* cited by examiner

Comparative Example 1

Example 1

Example 2

Example 3

Example 4

Example 5

Example 6

Example 7

Example 8

Example 9

Comparative Example 2

Comparative Example 3

Comparative Example 4

Comparative Example 5

Comparative Example 6

BARIUM SULFATE POWDER AND RESIN COMPOSITION COMPRISING SAME

TECHNICAL FIELD

The present invention relates to barium sulfate powder and a resin composition containing the powder.

BACKGROUND ART

Barium sulfate powder is widely used as filler in various applications. In inorganic pigments for example, barium sulfate powder is added as filler in resin compositions for purposes such as improving heat resistance, surface smoothness, mechanical strength, or other properties; whitening; and increasing weight. In optical films, barium sulfate powder is contained as filler in reflection films of liquid crystal products so that voids will be formed in the films upon being stretched, thereby enhancing the reflectance. As such, barium sulfate powder is desired to have excellent dispersibility in resins to sufficiently provide intended physical properties in various applications. Patent Literature 1 proposes coating of barium sulfate with an organic additive to improve the dispersibility of the barium sulfate in resins.

The applicant of the present application has developed an ultrafine barium sulfate particle coated with a hydroxide, an oxide, and/or a phosphate of a predetermined metallic element (see, Patent Literature 2). The ultrafine barium sulfate particle has excellent dispersibility in water and excellent affinity for water-borne resins, and is therefore extremely useful in various applications such as water-borne coatings and water-borne ink compositions.

CITATION LIST

Patent Literature

Patent Literature 1: JP 2003-523914 T
Patent Literature 2: WO2007/069353

SUMMARY OF INVENTION

Technical Problem

As described earlier, barium sulfate powder is desired to have excellent dispersibility in resins. Usually, resin compositions are used after they are formed (or molded) into chemical fibers or films. In resin compositions containing filler which is poorly dispersible in resin, the filler forms agglomerates which would cause thread breakage or uneven film surface. From this point of view too, dispersibility in resins may be one of very important properties of barium sulfate powder which can be used as filler. Barium sulfate powder having a very small particle size is considered to be suitable to improve heat resistance, surface smoothness, mechanical strength, and the like or to form fine voids. However, finer powder has higher cohesiveness and is more difficult to disperse in resins.

In the event of dispersing filler in solutions such as coatings, usually the dispersion is performed for a long time with a disperser using medium and having high dispersing power. In contrast, for dispersion in resins, usually filler is added to heat-molten resin, and they are kneaded to disperse the filler in the resin with a screw such as a twin-screw extruder or a roll. Such a disperser has a lower dispersing power than a disperser using medium. Thus, homogeneous dispersion of barium sulfate powder, which is very fine, in resins is not easy or rather difficult. Additionally, extending the duration of dispersion may cause resin degradation.

The barium sulfate in Patent Literature 1 is covered with an organic additive to be better dispersed in resins. However, Patent Literature 1 describes in EXAMPLES only barium sulfate having a large particle size with an average particle diameter (d50) of 500 to 4900 nm and does not examine fine barium sulfate having a number average primary particle size of 100 nm or less, for example. It is a common knowledge in the art of powder that finer powder is more difficult to disperse. Thus, further improvement is needed to develop barium sulfate powder which has a very small particle size but is excellently dispersible in resins, which is contradictory to the common knowledge.

The ultrafine barium sulfate particle disclosed in Patent Literature 2 has excellent dispersibility in water and excellent affinity for water-borne resins. Such a particle is extremely useful in various applications including water-borne coatings and water-borne ink compositions. Still, it has room for improvement to exhibit excellent dispersibility in solvents or resins, in particular in non-polar resins.

The present invention is made in view of the current state of the art and aims to provide fine barium sulfate powder that can be readily and simply dispersed in resins or solvents. The present invention also aims to provide a resin composition, a coating composition, an ink composition, and a resin molded article each containing the barium sulfate powder, and furthermore relates to a method for producing the barium sulfate powder.

Solution to Problem

The present inventors intensively studied barium sulfate powder and found that barium sulfate powder having a number average primary particle size of 1 to 100 nm, including an organic compound on its surface, and having a contact angle in a predetermined range has excellent dispersibility in solvents or resins such as non-polar resins despite the small particle size. Such barium sulfate powder can be readily and simply dispersed in solvents or resins without high energy or without taking a long time. The barium sulfate powder can be suitably obtained for example by a production method including adding a predetermined organic compound to a barium sulfate substrate having a number average primary particle size of 1 to 100 nm. Furthermore, a resin composition containing the barium sulfate powder is especially useful as a coating composition or an ink composition. Accordingly, the inventors completed the present invention that can perfectly solve the above-mentioned problems.

Specifically, the present invention relates to barium sulfate powder having a number average primary particle size of 1 to 100 nm, the powder including an organic compound on its surface, the powder in the form of compressed compact having a contact angle with distilled water of 10 to 170 degrees.

The organic compound preferably has a C4 or longer carbon chain and/or a siloxane bond.

The present invention is also directed to a resin composition containing the barium sulfate powder and a resin.

The resin is preferably at least one thermoplastic resin selected from the group consisting of polyvinyl chloride, polyethylene resins, polyester resins, polyamide resins, and polyacrylic resins.

The present invention is also directed to a coating composition or an ink composition containing the resin composition; in other words, a coating composition or an ink composition containing the barium sulfate powder and a resin.

The present invention is also directed to a resin molded article including the resin composition.

Preferably, the number of barium sulfate agglomerates with a size of 10 μm or more is not more than 10 in a field of view of 1 mm² of a scanning electron micrograph of the resin molded article.

The present invention is also directed to a method for producing barium sulfate powder, including adding an organic compound that has a C4 or longer carbon chain and/or a siloxane bond to a barium sulfate substrate having a number average primary particle size of 1 to 100 nm.

Preferably, the amount of the organic compound is 2 to 20 parts by weight per 100 parts by weight of the barium sulfate substrate.

Advantageous Effects of Invention

The barium sulfate powder of the present invention with the above-described structure has excellent dispersibility in solvents or various resins despite the very small particle size. Such barium sulfate powder can be readily and simply dispersed in solvents or resins without high energy or without taking a long time and is thus industrially extremely advantageous. Owing to the very small particle size, the barium sulfate powder can not only effectively exhibit various physical properties such as heat resistance, surface smoothness, and mechanical strength but greatly contribute to, for example, formation of fine voids during reflection film production as well. Since the powder is sufficiently prevented from agglomerating in resin compositions, it can be suitably used as filler for chemical fibers or films without causing thread breakage or uneven film surface. Additionally, use of the powder can provide resin compositions with high transparency. Hence, the barium sulfate powder of the present invention is in particular useful as filler for resin compositions, solvent-based coatings, inks, and the like.

DESCRIPTION OF EMBODIMENTS

Figure 1:
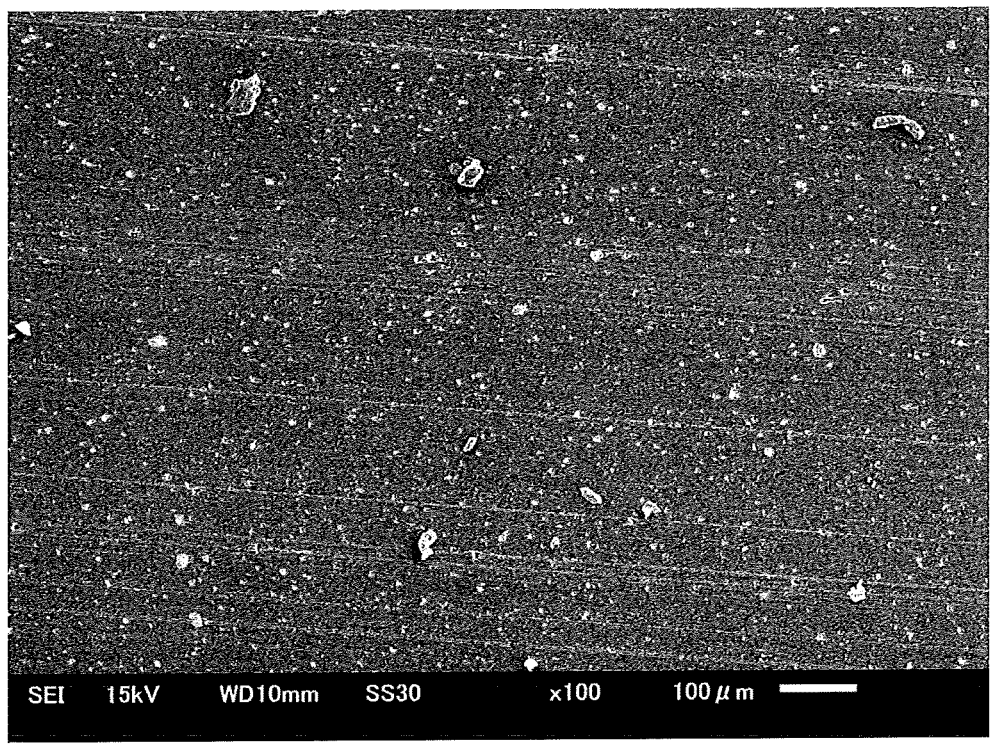
FIG. 1 shows a scanning electron micrograph taken in Comparative Example 1.

Preferred embodiments of the present invention are specifically described below. The present invention is not limited to these embodiments, and suitable modifications may be made without departing from the gist of the present invention.

1. Barium Sulfate Powder

The barium sulfate powder of the present invention has a number average primary particle size of 1 to 100 nm. Resin compositions containing the barium sulfate powder having a number average primary particle size of 100 nm or less have excellent transparency. Furthermore, the barium sulfate powder can effectively exhibit various physical properties such as heat resistance, surface smoothness, and mechanical strength and also positively functions to form fine voids during reflection film production, for example. The upper limit of the number average primary particle size is preferably 70 nm or less, more preferably 50 nm or less, still more preferably 30 nm or less.

The term "number average primary particle size" herein refers to a number average unidirectional primary particle size in an electron micrograph. Specifically, it can be measured by the method described later in EXAMPLES.

The barium sulfate powder includes an organic compound on its surface. The term "including an organic compound on its surface" means at least a part of the surface of the barium sulfate powder is coated with an organic compound. The organic compound may be used alone or in combinations of two or more.

The organic compound preferably has a C4 or longer carbon chain and/or a siloxane bond. The term "C4 or longer carbon chain" herein refers to a chain of connected four or more carbon atoms, namely without another element such as an oxygen or nitrogen element therebetween. Such an organic compound causes the barium sulfate powder to be sufficiently hydrophobic so that agglomeration of the powder is sufficiently suppressed upon kneading with solvents or resins. Thus, the barium sulfate powder has a higher affinity for resins or solvents to be better dispersed in solvents or resins. The carbon number of the carbon chain is preferably 8 or more, more preferably 10 or more, still more preferably 12 or more, particularly preferably 14 or more, most preferably 16 or more. The upper limit of the carbon number of the carbon chain is not particularly limited. Yet, it is preferably 30 or less, more preferably 24 or less in view of availability.

Examples of the carbon chain include alkyl groups, alkenyl groups, and alkynyl groups. Preferred among these are alkyl groups for better dispersibility in solvents or resins. The carbon chain may be linear, branched, or cyclic, preferably linear or branched.

The organic compound preferably has at least one hydrophilic group. In particular, the organic compound with a C4 or longer carbon chain suitably has a hydrophilic group as well. When both a hydrophilic group and a hydrophobic group (carbon chain) are present, the hydrophilic group acts on the surface of barium sulfate (barium sulfate substrate) forming the barium sulfate powder, and the hydrophobic group enhances the affinity for resins or solvents, so that the effects of the present invention can be more sufficiently achieved.

The hydrophilic group is not particularly limited. Suitable examples thereof include carboxyl groups, silanol groups, and phosphate groups. The organic compound may have two or more hydrophilic groups.

Examples of the organic compound having a C4 or longer carbon chain include alcohols, glycerols, fatty acids, silane coupling agents, and phosphate esters. Preferred are saturated fatty acids, silane coupling agents, and phosphate esters. Examples of the saturated fatty acids include capric acid, lauric acid, myristic acid, palmitic acid, stearic acid, and isostearic acid. Examples of the silane coupling agents include alkoxysilanes such as decyltrimethoxysilane and octyltrimethoxysilane. Examples of the phosphate esters include acidic phosphate esters such as isodecyl acid phosphate, lauryl acid phosphate, isotridecyl acid phosphate, stearyl acid phosphate, and isostearyl acid phosphate.

The organic compound which has a C4 or longer carbon chain may additionally contain an organic compound having a C4 or shorter chain, such as trimethylolethane, trimethylolpropane, monomethanolamine, diethanolamine, or trimethanolamine, as long as the performances are not reduced.

The organic compound which has a siloxane bond (Si—O—Si bond) is preferably a polysiloxane compound having at least two structural units represented by [—Si($R^1$)$_2$—O-] wherein $R^1$ represents a hydrogen atom or a methyl group. Specifically, suitable examples of the compound include dimethyl silicone oil and methyl hydrogen silicone oil.

The amount in terms of carbon of the organic compound in the barium sulfate powder of the present invention is preferably 0.5% by weight or more. In this case, the affinity and dispersibility in solvents or resins are further improved. In addition, the coating of at least a part of the surface of the barium sulfate powder with the organic compound is more strongly suggested. The amount is more preferably 0.6% by weight or more. For the organic compound having a C4 or longer carbon chain, the amount thereof in terms of carbon is preferably 1.2% by weight or more, more preferably 1.8% by weight or more. The upper limit of the amount is not particularly limited. Yet, the upper limit is preferably 10% by weight or less to sufficiently prevent degradation or viscosity increase of the resin when used with the barium sulfate powder. The amount (in terms of carbon) is more preferably 8% by weight or less, still more preferably 6% by weight or less.

Herein, the amount in terms of carbon of the organic compound can be determined by the method described later in EXAMPLES.

The barium sulfate powder of the present invention, even if coated with an inorganic compound, can exhibit the effects depending on the amount of the inorganic compound. Thus, the barium sulfate powder of the present invention encompasses embodiments in which the barium sulfate powder includes both an organic compound and an inorganic compound on its surface.

Examples of the inorganic compound coating the barium sulfate powder include alumina, aluminum hydroxide, zinc oxide, silica, hydrous alumina, and hydrous silica.

The barium sulfate powder in the form of compressed compact has a contact angle with distilled water of 10 to 170 degrees. The barium sulfate powder having a contact angle within the range indicated above has excellent dispersibility in solvents or resins. The lower limit of the contact angle is preferably 20 degrees or larger, more preferably 25 degrees or larger, still more preferably 50 degrees or larger, particularly preferably 90 degrees or larger.

Herein, the contact angle can be measured by the method described later in EXAMPLES.

The barium sulfate powder preferably has a degree of whiteness of 85 or higher and 100 or lower. A higher degree of whiteness indicates brighter whiteness, while a lower degree of whiteness indicates greater coloration. The barium sulfate powder having a degree of whiteness within the range indicated above is preferred because such barium sulfate powder has higher transparency and, when colored, provides a resin composition with bright color tone. The degree of whiteness is more preferably 90 or higher, still more preferably 95 or higher, particularly preferably 97 or higher, most preferably 97.5 or higher.

Herein, the degree of whiteness can be measured by the method described later in EXAMPLES.

The barium sulfate powder preferably has a bulk specific gravity of 0.6 g/cm$^3$ or less. Having such a bulk specific gravity, the barium sulfate powder better exhibits the effect of the present invention, i.e., having excellent dispersibility in solvents or resins despite the very small particle size. The bulk specific gravity is more preferably 0.5 g/cm$^3$ or less, still more preferably 0.4 g/cm$^3$ or less.

Herein, the bulk specific gravity can be measured by the method described later in EXAMPLES.

The barium sulfate powder is colored when it contains an iron component (Fe component). To obtain better transparency, the powder preferably has as low an iron component content as possible. Since iron components are magnetic and conductive, the resin composition to be used for electronic materials preferably has as low an iron component content as possible. Specifically, the iron component content in terms of iron element (Fe) is preferably 100 ppm or less, more preferably 50 ppm or less, still more preferably 20 ppm or less, particularly preferably 10 ppm or less.

Herein, the iron component content can be measured by the method described later in EXAMPLES.

2. Method for Producing Barium Sulfate Powder

The method for producing barium sulfate powder of the present invention includes adding an organic compound that has a C4 or longer carbon chain and/or a siloxane bond to a barium sulfate substrate having a number average primary particle size of 1 to 100 nm. The barium sulfate powder of the present invention can be suitably produced by this method. Namely, the production method is suitable to produce the barium sulfate powder of the present invention. The method may further include one or more step(s) usually conducted in powder production.

<Addition>

The addition is performed by adding an organic compound to a barium sulfate substrate having a number average primary particle size of 1 to 100 nm. The materials such as barium sulfate substrate, the organic compound, and optional additives may each be used alone or in combinations of two or more.

The barium sulfate substrate may be synthesized but is not limited to a synthetic one. The barium sulfate substrate may be prepared by pulverization with a mill such as a bead mill. Alternatively, the barium sulfate substrate may be a commercial product (BARIFINE(®) BF-1, BF-10, BF-20, or BF-40, available from Sakai Chemical Industry Co., Ltd.). The synthetic barium sulfate substrate may be synthesized by reacting a barium source (for example, barium hydroxide, barium sulfide, barium chloride, barium nitrate, etc.) with a sulfuric acid source (sulfuric acid, sodium sulfate, ammonium sulfate, etc.). Specifically, it is suitably synthesized in accordance with the technique described in paragraph [0024] of WO 2007/069353.

The shape of the barium sulfate substrate is not particularly limited. Yet, it is preferably spherical, cubic, or a shape with an aspect ratio of 2 or less.

The barium sulfate substrate has a number average primary particle size of 1 to 100 nm, preferably 70 nm or less, more preferably 50 nm or less, still more preferably 30 nm or less. The barium sulfate substrate having a smaller particle size provides higher transparency or increases the smoothness of a resin molded article or the like and is thus preferred.

The addition may be performed by either adding an organic compound to a slurry containing the barium sulfate substrate (addition by wet process) or adding an organic compound to the dry barium sulfate substrate (addition by dry process). Yet, the addition is preferably performed by the wet process in consideration of a higher agglomeration tendency of dry powder.

The addition by wet process is specifically described below. The addition by the dry process is preferably performed by adding an organic compound to the dry barium sulfate substrate, followed by pulverization in the presence of the organic compound. The addition in this manner enables production of barium sulfate powder having high affinity for solvents or resins.

In the slurry, the barium sulfate substrate is preferably dispersed in a liquid medium. Non-limiting examples of the liquid medium include water and organic solvents (for example, alcohols, silicone oils, or glycols), and water is preferred among them. Namely, the slurry is preferably a water slurry. In this case, the addition is preferably performed by preparing a slurry by mixing an aqueous solution of a barium source with an aqueous solution of a sulfuric acid source and then adding the organic compound to the slurry without drying the slurry. The addition in this manner enables production of barium sulfate powder having higher affinity for solvents or resins.

The prepared slurry is preferably treated for sufficient dispersion using a disperser such as a bead mill before an organic compound is added thereto. Alternatively, the slurry is preferably treated for sufficient dispersion using a disperser such as a bead mill during or after the addition of an organic compound. Common dispersants may be used to enhance the dispersion of the barium sulfate in the slurry.

The organic compound to be used in the addition is as described above.

The amount of the organic compound per 100 parts by weight of the barium sulfate substrate is preferably 2 to 20 parts by weight. When the organic compound is added in an amount of 2 parts by weight or more, the affinity for solvents or resins increases to more sufficiently prevent formation of agglomerates. When the organic compound is added in an amount of 20 parts by weight or less, degradation or viscosity increase of a resin used with the resulting barium sulfate powder can be sufficiently prevented. The lower limit of the amount is more preferably 4 parts by weight or more, still more preferably 6 parts by weight or more. The upper limit is more preferably 15 parts by weight or less.

The temperature of the slurry upon adding the organic compound thereto may be any temperature at which the organic compound is dissolved or dispersed in the solvent and is preferably 40° C. to 100° C. When the organic compound is added to the slurry at a temperature within the range indicated above, the organic compound is sufficiently dissolved or dispersed in the slurry, so that the reaction efficiency of the organic compound increases. Thus, the barium sulfate powder to be obtained more sufficiently exhibits its effects. The temperature of the slurry is more preferably 50° C. to 100° C.

In the case where the organic compound and the inorganic compound are used in combination as materials for coating the barium sulfate substrate, a preliminarily prepared mixture of the organic compound and the inorganic compound may be added to the barium sulfate substrate. Alternatively, the organic compound and the inorganic compound may be separately added sequentially, whichever may be first, to the barium sulfate substrate.

Examples of the inorganic compound added to coat the barium sulfate substrate include sodium aluminate, sodium silicate, zinc chloride, and zinc sulfate.

<Aging>

The addition (preferably addition by wet process) is suitably followed by aging. The surface of the aged barium sulfate substrate is more sufficiently coated with the organic compound, thereby further enhancing dispersibility in solvents or resins. For example, the aging is preferably performed at 40° C. to 150° C. for 0.1 to 10 hours, though not limited thereto.

<Drying/Pulverization>

After the addition (after the aging, if performed), washing may be performed as needed but is preferably followed by drying and/or pulverization. The drying may be performed by any method under any conditions, for example by heating with a heat source such as steam, electricity, gas, or infrared rays, or by vacuum or reduced pressure drying. The pulverization may be performed by any method under any conditions as long as agglomerates formed in the drying are broken; for example, by pulverization using an air current pulverizer.

3. Resin Composition

The resin composition of the present invention contains the barium sulfate powder of the present invention and a resin. The resin composition may contain other ingredients. The ingredients may be used alone or in combinations of two or more.

The resin is not particularly limited and may be appropriately selected depending on the intended application. For example, a non-polar resin is suitable in view of insulation. The resin is preferably a thermoplastic resin and is more suitably at least one thermoplastic resin selected from the group consisting of polyvinyl chloride, polyethylene resins, polyester resins, polyamide resins, and polyacrylic resins.

The mass ratio of the barium sulfate powder to the resin in the resin composition is not particularly limited and may be appropriately determined depending on the intended application and the like. For example, the amount of the barium sulfate powder per 100 parts by weight of the resin is preferably 1 to 50 parts by weight. The barium sulfate powder and the resin contained at the above-mentioned ratio have a higher affinity for each other. The amount of the barium sulfate is more preferably 10 parts by weight or more and is more preferably 40 parts by weight or less.

The resin composition can be prepared by mixing or kneading the barium sulfate powder, the resin, and other optional ingredients by a usual technique.

The resin composition contains the barium sulfate powder homogeneously dispersed therein. Thus, the resin composition is excellent not only in transparency and stability but in other properties as well such as heat resistance, surface smoothness, and mechanical strength. Such a resin composition is useful as a pigment and is preferably applicable to coatings or inks. The resin composition is suitably used as a material for films such as reflection films.

4. Coating Composition, Ink Composition

The coating composition or ink composition of the present invention contains the barium sulfate powder of the present invention and a resin. The composition may contain other optional ingredients. The ingredients may be used alone or in combinations of two or more. Resins usable here are the same as the above-mentioned resins which are preferably usable in the resin composition of the present invention.

The coating composition or ink composition may contain other additives as needed depending on the purpose or application. The additives are not particularly limited. Examples of suitable additives for the coating composition include dispersants, wetting agents, leveling agents, thixotropy-imparting agents, thickeners, anti-sagging agents, antifungal agents, ultraviolet absorbers, film formation auxiliary agents, organic solvents, and organic or inorganic pigments excluding barium sulfate powder. Examples of suitable additives for the ink composition include antiseptic agents, antifungal agents, pH adjusters, rust inhibitors, surfactants, organic solvents, and organic or inorganic pigments excluding barium sulfate powder.

The coating composition and the ink composition can be prepared by mixing or kneading the barium sulfate powder, the resin, and other optional ingredients by a usual technique.

5. Resin Molded Article

The resin molded article of the present invention contains the resin composition of the present invention described above. Specifically, it is a molded article of the resin composition. Thus, the resin molded article has excellent properties such as transparency, heat resistance, surface smoothness, and mechanical strength and is suitably usable in various applications. The shape of the resin molded article is not particularly limited, and examples include sheet, film, coat, and other shapes such as string, plate, rod, pellet, and tube. Specific examples of the resin molded article include films and chemical fibers.

In a field of view of 1 mm$^2$ of a scanning electron micrograph of the resin molded article, the number of barium sulfate agglomerates with a size of 10 μm or more is not more than 10. The barium sulfate powder as a material of the resin molded article has a number average primary particle size of 1 to 100 nm, which is smaller than the wavelength of visible light. Powder of this size may partly form agglomerates when dispersed in resin. In this case, agglomerates with a size of 10 μm or more may cause unevenness in molded (formed) films. Moreover, when such powder is used to form films having a thickness of about 10 μm, film formation is difficult due to the agglomerates larger than the film thickness. When it is used to form fibers, the agglomerates may cause thread breakage. Agglomerates larger than the wavelength of visible light may scatter visible light to reduce transparency, while the transparency is enhanced when the dispersed barium sulfate powder is smaller than the wavelength of visible light. In view of the above, the number of agglomerates with a size of 10 μm or more, though different from the wavelength of visible light, in the resin molded article is preferably as small as possible. Thus, the number of agglomerates with a size of 10 μm or more is appropriately 10 or less, preferably 6 or less, more preferably 5 or less, still more preferably 3 or less, particularly preferably 0.

Herein, the number of agglomerates with a size of 10 μm or more can be measured by the method described later in EXAMPLES.

EXAMPLES

The present invention is described in detail with reference to examples below, but the present invention is not limited to these examples. The evaluations and measurement conditions for various physical properties and the like are as follows.

1) Number Average Primary Particle Size

Transmission electron micrographs of the powder at 100000 times magnification were taken (with JEM-2100 available from Jeol Ltd.) while randomly changing the field of vision. Unidirectional primary particle sizes of 300 particles in the micrographs were measured. The average value of the measured sizes was calculated and determined as a number average primary particle size.

2) Contact Angle

An amount of 7.5 g of a target sample (powder) was put in an aluminum ring having an outer diameter of 44 mm, an inner diameter of 40 mm, and a height of 5 mm. The sample was molded at a pressure of 120 MPa using a tablet briquetting press (model number: BRE-33) available from Maekawa Testing Machine MFG Co., Ltd. to prepare a specimen (compressed compact). The specimen was placed on a horizontal table, and 0.2 g of distilled water was dropped on the specimen. An image of the specimen was taken using a digital camera within 5 seconds of the dropping. The angle of a tangent between the specimen and distilled water was measured with a protractor. In the event of permeation of distilled water into the specimen too soon to take an image after the dropping or permeation of distilled water into the specimen within 5 seconds of the dropping, even when image-taking was possible, the sample was determined to be hydrophilic, and the measurement was discontinued.

3) Amount of Organic Compound in Terms of Carbon (Carbon Amount)

The carbon amount was analyzed using a solid carbon analyzer "EMIA-110" available from Horiba Ltd.

4) Bulk Specific Gravity

The bulk specific gravity was measured in accordance with JIS K5101 "Test methods for pigments—Part 12: Apparent density—Section 1: Stationary method".

5) Iron Content

An amount of 5 g of a target sample was heated in an electric furnace at 500° C. for 60 minutes to remove organic components (e.g., organic compounds). The heated sample was entirely put in a beaker containing 100 mL of 2% by weight hydrochloric acid, followed by stirring for 60 minutes to dissolve Fe components. The resulting solution was filtrated through a 5C filter paper. The iron (Fe) content of the filtered solution was measured using an ICP optical emission spectrometer (model number: SPS3520) available from SII NanoTechnology Inc.

6) Powder Color (Degree of Whiteness (W))

An amount of 7.5 g of a target sample (powder) was put in an aluminum ring having an outer diameter of 44 mm, an inner diameter of 40 mm, and a height of 5 mm. The sample was molded at a pressure of 120 MPa using a tablet briquetting press (model number: BRE-33) available from Maekawa Testing Machine MFG Co., Ltd. to prepare a specimen. The specimen was analyzed using a powder color meter (model number: SPECTRO COLOR METER SE-6000) available from Nippon Denshoku Industries Co., Ltd. The degree of whiteness was calculated based on the following formula (1):

$$W=100-[(100-L)^2+(a^2+b^2)]^{1/2} \quad (1)$$

wherein L, a, and b denote brightness, chroma, and hue, respectively, in the Hunter color system.

7) Number of Agglomerates with a Size of 10 μm or More (Also Referred to as "10 μm Particles")

A sample (barium sulfate powder) was added to polyethylene resin (NOVATEC HB420R available from Japan Polyethylene Corporation) in an amount of 20 parts by weight per 100 parts by weight of the polyethylene resin, and they were kneaded for dispersion at a temperature of 200° C. and a rotation speed of 50 rpm for 10 minutes in a Labo Plastomill (available from Toyo Seiki Co., Ltd.). The surface of the dispersion mixture (resin composition) was made smooth as needed using a rotary microtome RM2265 (available from Leica Biosystems). The surface was observed using a scanning electron microscope (JSM-6510A available from Jeol Ltd.) to count the number of agglomerates with a size of 10 μm or more in a field of view of 1 mm$^2$ of a scanning electron micrograph.

8) Spectral Transmittance

A sample (barium sulfate powder) was added to vinyl chloride resin (ZEST1000Z available from Shin Dai-ichi Vinyl Corporation) in an amount of 20 parts by weight per 100 parts by weight of the vinyl chloride resin, and they were kneaded for dispersion using a twin-roll kneader (φ8×20 inch test roll available from Kansai Roll Co., Ltd.) at a temperature of 167° C. and rotation speeds of one roll of 22 rpm and the other roll of 18 rpm for 6 minutes. The dispersion mixture (resin composition) was treated using a press at 160° C. to a thickness of 0.5 mm, and the transmittance thereof at 550 nm was measured using a V-770 UV-Visible/NIR spectrophotometer (available from Jasco Corporation).

Preparation Example 1 (Preparation of Barium Sulfate Slurry)

A Warman pump with an inlet diameter of 40 mm, an outlet diameter of 25 mm, an internal volume of 850 mL, and an impeller rotation speed of 2380 rpm was used as a reactor. A 110 g/L (1.1 mol/L) sulfuric acid aqueous solution at 30° C. was sucked into the pump at a constant flow rate of 700 L/h, and simultaneously a 120 g/L (0.71 mol/L) barium sulfide aqueous solution at 50° C. was sucked into the pump at a constant rate of 1180 L/h to cause a reaction. The reaction product was aged at 70° C. for 3 hours to prepare a barium sulfate slurry having a solids content of 100 g/L.

The slurry was filtrated, washed with water, and dried to give barium sulfate (barium sulfate substrate). The number average unidirectional primary particle size of the barium sulfate was measured to be 50 nm.

Comparative Example 1

The temperature of 1 L of the barium sulfate slurry prepared in Preparation Example 1 was adjusted to 30° C. and the slurry was aged for 30 minutes. The aged slurry was filtrated through a 5C filter paper, washed with ion exchange water, and dried in a box-type thermostatic bath at 100° C. The dried sample was pulverized using an air current pulverizer (SJ-500 available from Nisshin Engineering Inc.) to prepare barium sulfate powder (C1).

Example 1

The barium sulfate slurry prepared in Preparation Example 1 in an amount of 1 L was warmed to 80° C., and 4.0 g of stearic acid was added thereto, followed by aging for 30 minutes. The aged slurry was filtrated through a 5C filter paper, washed with ion exchange water, and dried in a box-type thermostatic bath at 100° C. The dried sample was pulverized using an air current pulverizer (SJ-500 available from Nisshin Engineering Inc.) to prepare barium sulfate powder (1).

Example 2

Barium sulfate powder (2) was prepared as in Example 1, except that 10.0 g of stearic acid was used.

Example 3

Barium sulfate powder (3) was prepared as in Example 1, except that 4.0 g of sodium stearate was used instead of stearic acid, and the aging time was changed to 30 minutes.

Example 4

Barium sulfate powder (4) was prepared as in Example 1, except that decyltrimethoxysilane was used instead of stearic acid.

Example 5

Barium sulfate powder (5) was prepared as in Example 1, except that isostearyl acid phosphate (Phoslex A-1 8 0L available from SC Organic Chemical Co., Ltd.) was used instead of stearic acid.

Example 6

Barium sulfate powder (6) was prepared as in Example 1, except that methyl hydrogen silicone (Shin-Etsu Silicone KF-9 9 available from Shin-Etsu Chemical Co., Ltd.) was used instead of stearic acid.

Example 7

Barium sulfate powder (7) was prepared as in Example 1, except that methyl hydrogen silicone (Shin-Etsu Silicone KF-96 available from Shin-Etsu Chemical Co., Ltd.) was used instead of stearic acid.

Example 8

Barium sulfate powder (8) was prepared as in Example 1, except that 2.5 g of diethanolamine was added and stirred for 10 minutes before the slurry was warmed to 80° C. and the amount of the stearic acid was changed to 5.0 g.

Example 9

The barium sulfate slurry prepared in Preparation Example 1 in an amount of 1 L was warmed to 45° C., and sodium aluminate in an amount equivalent to 0.5 g of $Al_2O_3$ was added thereto. After stirring for 10 minutes, the mixture was neutralized with diluted sulfuric acid to pH 8.5 over 10 minutes and then aged for 30 minutes. The aged slurry was warmed to 80° C., and 5.0 g of stearic acid was added thereto, followed by aging for 30 minutes. The operation that followed was performed as in Example 1, thereby preparing barium sulfate powder (9).

Comparative Example 2

BARIACE® B-55 (available from Sakai Chemical Industry Co., Ltd.) was used in Comparative Example 2. The BARIACE B-55 had a number average primary particle size of 500 nm.

Comparative Example 3

BARIACE® B-30 (available from Sakai Chemical Industry Co., Ltd.) was used in Comparative Example 3. The BARIACE B-30 had a number average primary particle size of 200 nm.

Comparative Example 4

Barium sulfate powder (C4) was prepared as in Example 1, except that polyethylene glycol 2000 (available from Wako Pure Chemical Industries, Ltd.) was used instead of stearic acid.

Comparative Example 5

The barium sulfate slurry prepared in Preparation Example 1 in an amount of 1 L was warmed to 70° C. Sodium silicate No. 3 in an amount equivalent to 4 g of $SiO_2$ was diluted with 100 mL of pure water, and the dilution was added dropwise to the slurry over 20 minutes. To the resulting slurry was dropwise added over 20 minutes a dilution prepared by diluting sodium aluminate in an amount equivalent to 2 g of $Al_2O_3$ in 100 mL of pure water. After stirring for 10 minutes, the slurry was neutralized with diluted sulfuric acid to pH 8 over 30 minutes, followed by stirring for 10 minutes. The resulting slurry was filtrated, sufficiently washed with water, and dried to give dried chips. The chips were roughly crushed and then pulverized with an air current pulverizer to prepare barium sulfate powder (C5).

Comparative Example 6

Barium sulfate powder (C6) was prepared as in Example 1, except that 5.0 g of 1-hydroxyethane-1,1-diphosphonic acid (monohydrate) (available from Kishida Chemical Co., Ltd.) was used instead of 4.0 g of stearic acid.

Figure 2:
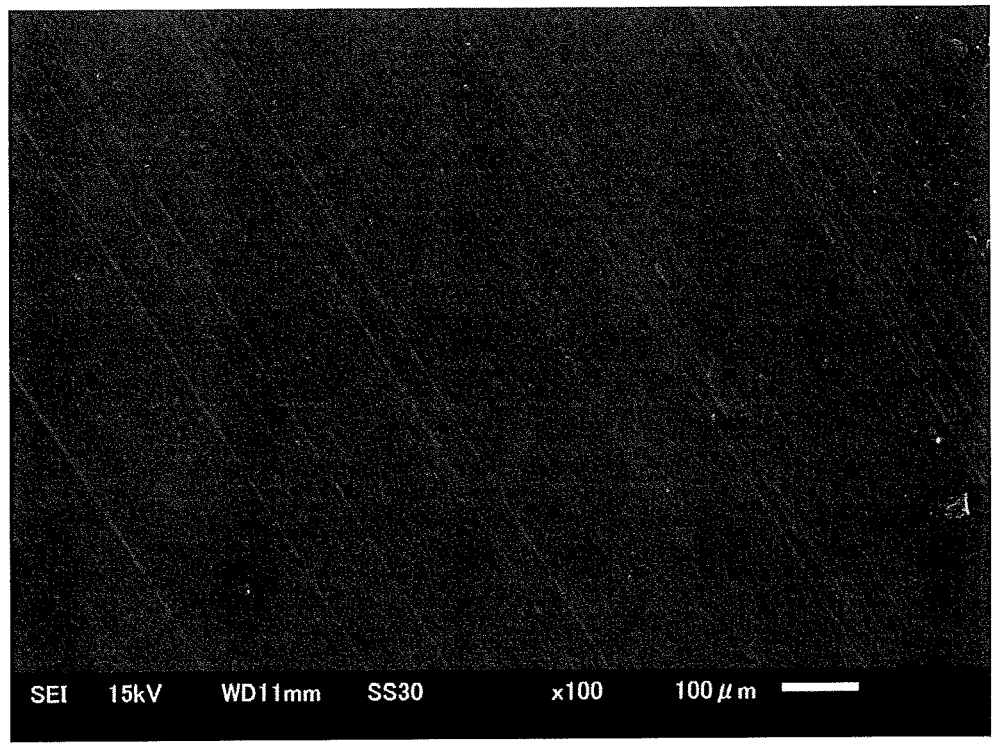
FIG. 2 shows a scanning electron micrograph taken in Example 1.
Figure 3:
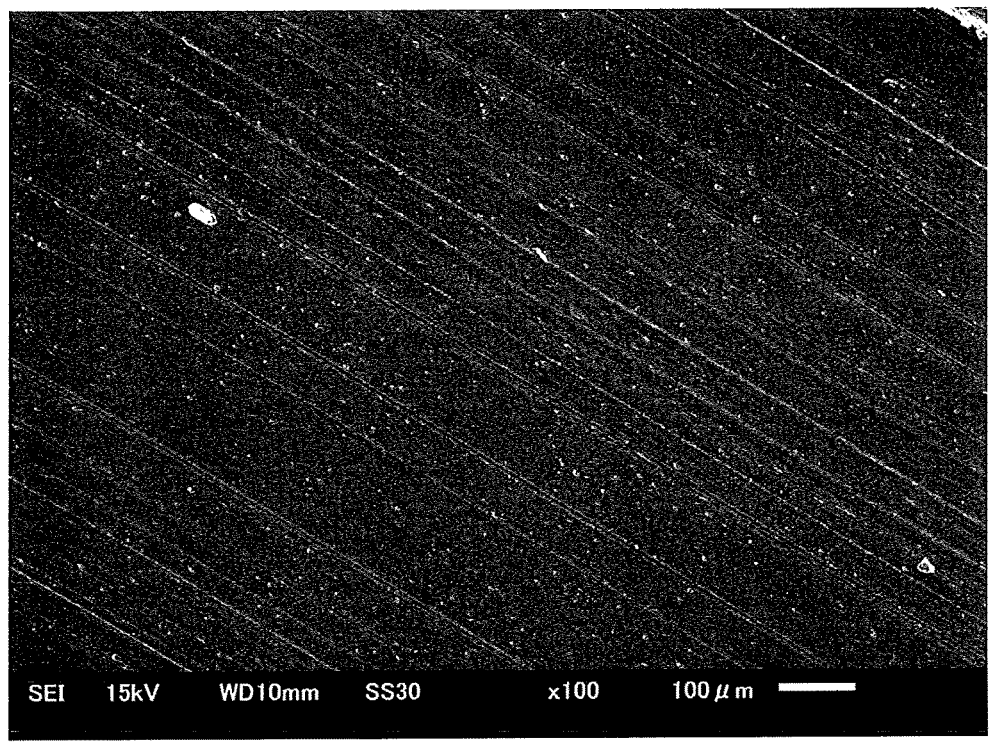
FIG. 3 shows a scanning electron micrograph taken in Example 2.
Figure 4:
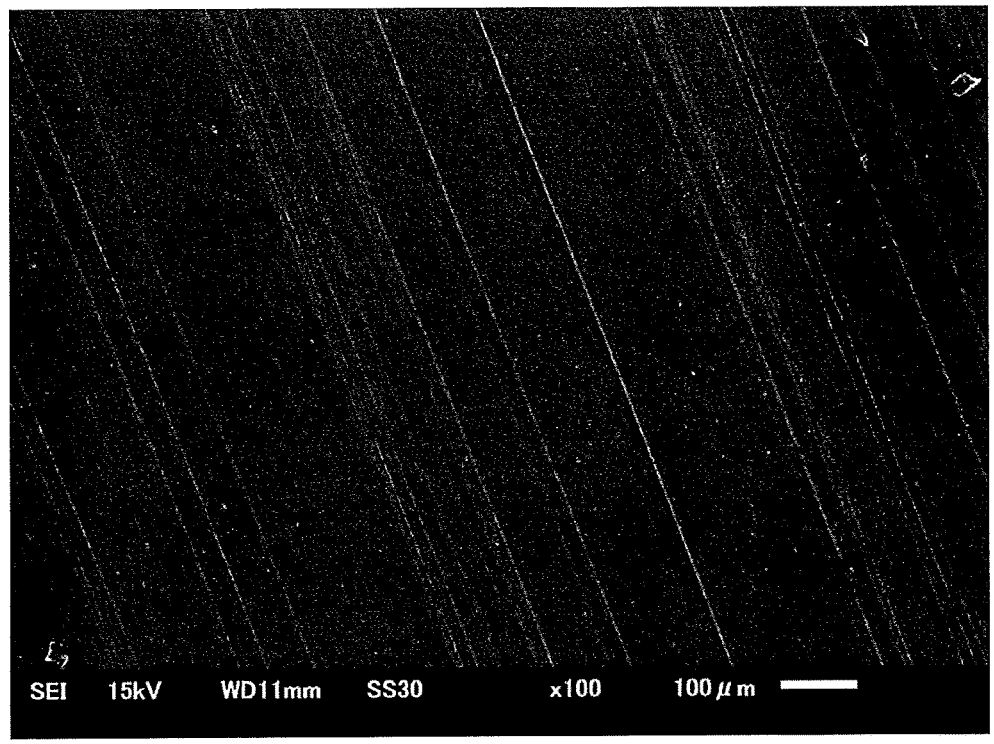
FIG. 4 shows a scanning electron micrograph taken in Example 3.
Figure 5:
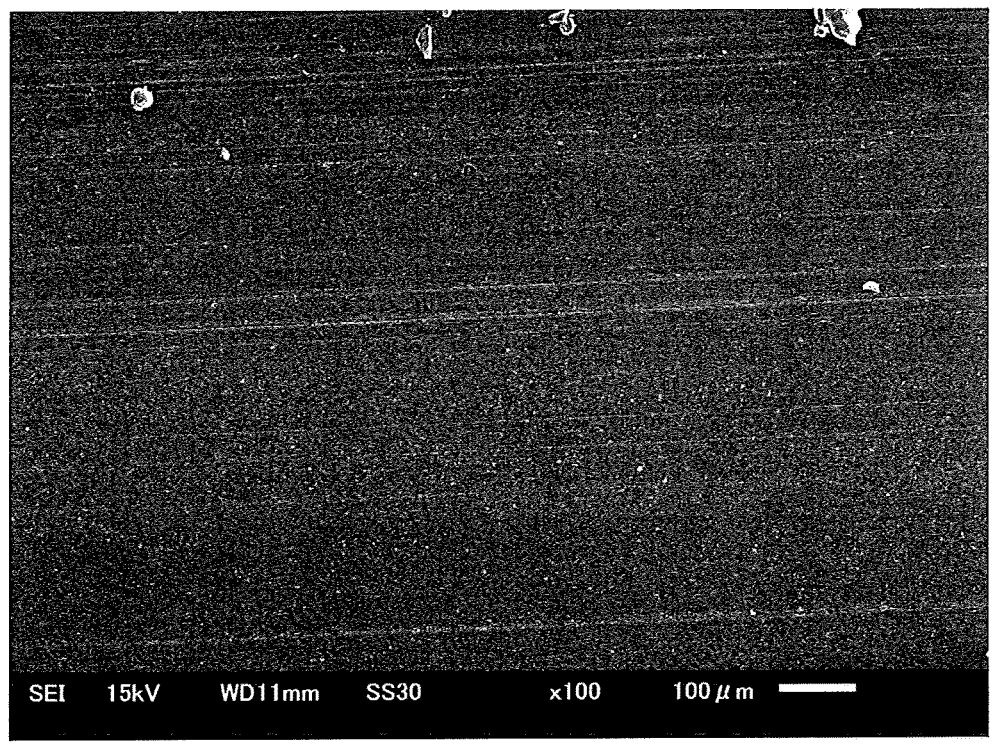
FIG. 5 shows a scanning electron micrograph taken in Example 4.
Figure 6:
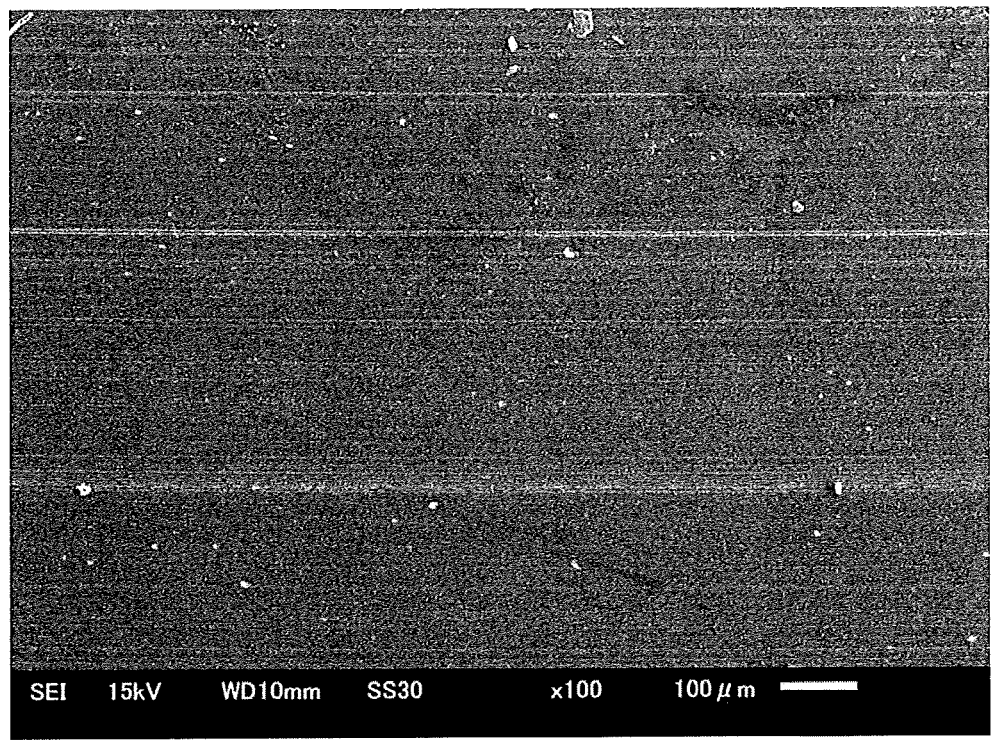
FIG. 6 shows a scanning electron micrograph taken in Example 5.
Figure 7:
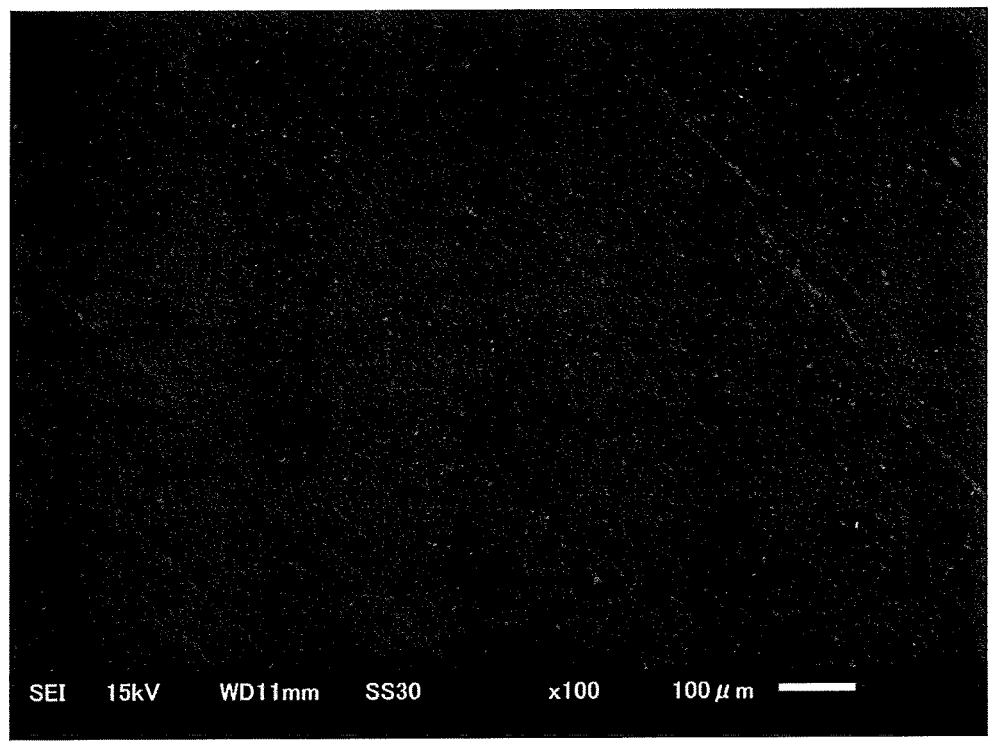
FIG. 7 shows a scanning electron micrograph taken in Example 6.
Figure 8:
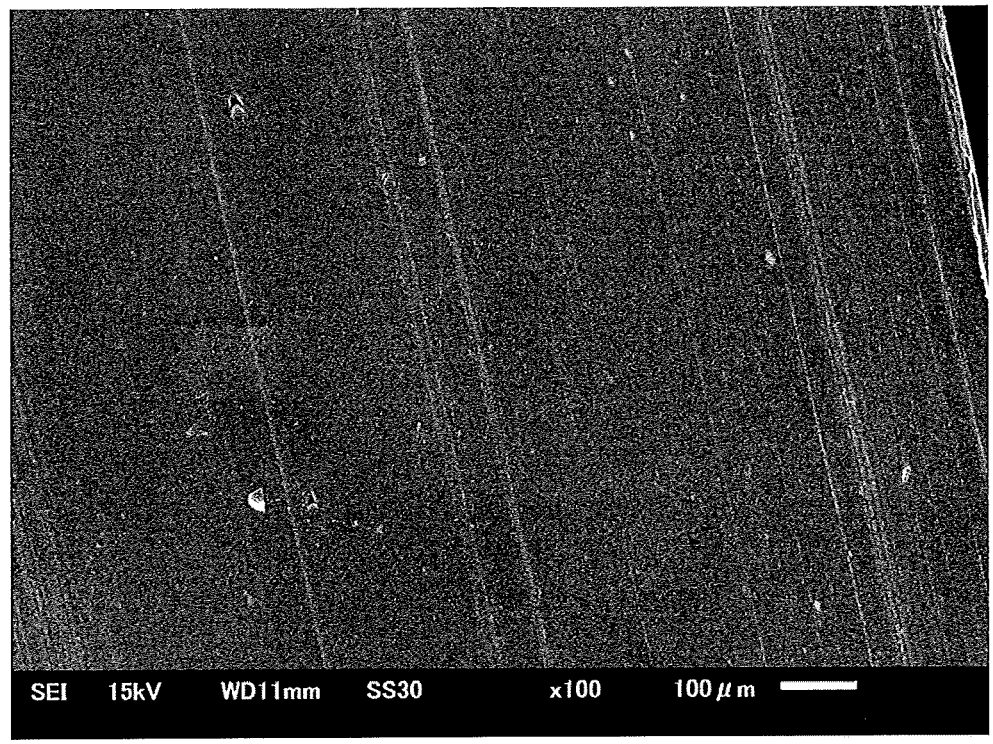
FIG. 8 shows a scanning electron micrograph taken in Example 7.
Figure 9:
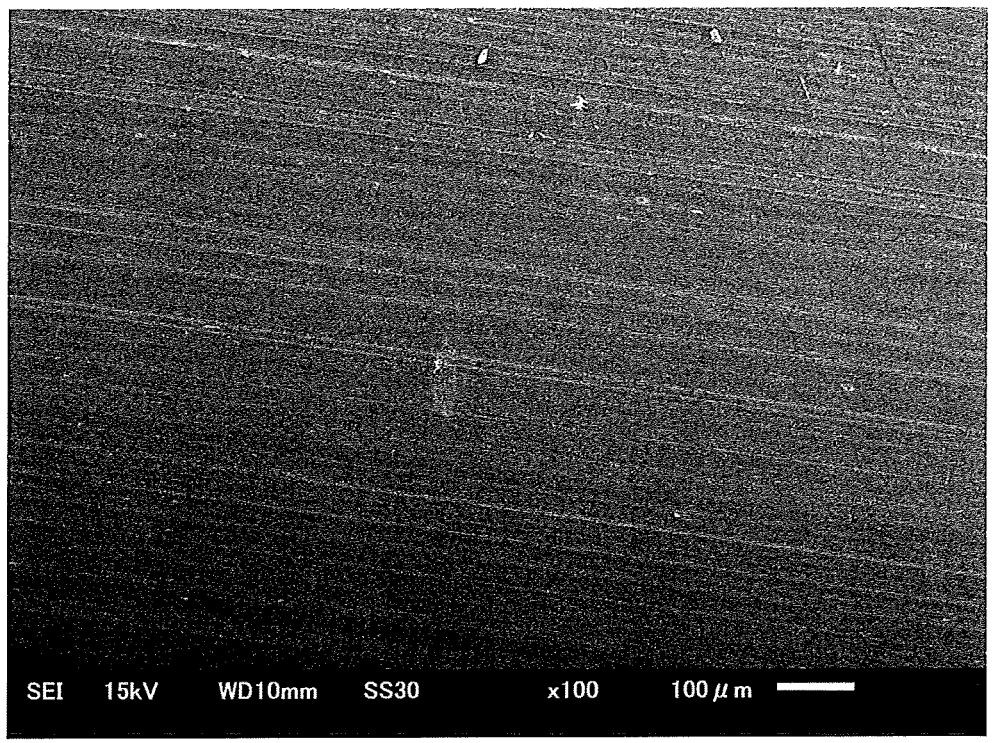
FIG. 9 shows a scanning electron micrograph taken in Example 8.
Figure 10:
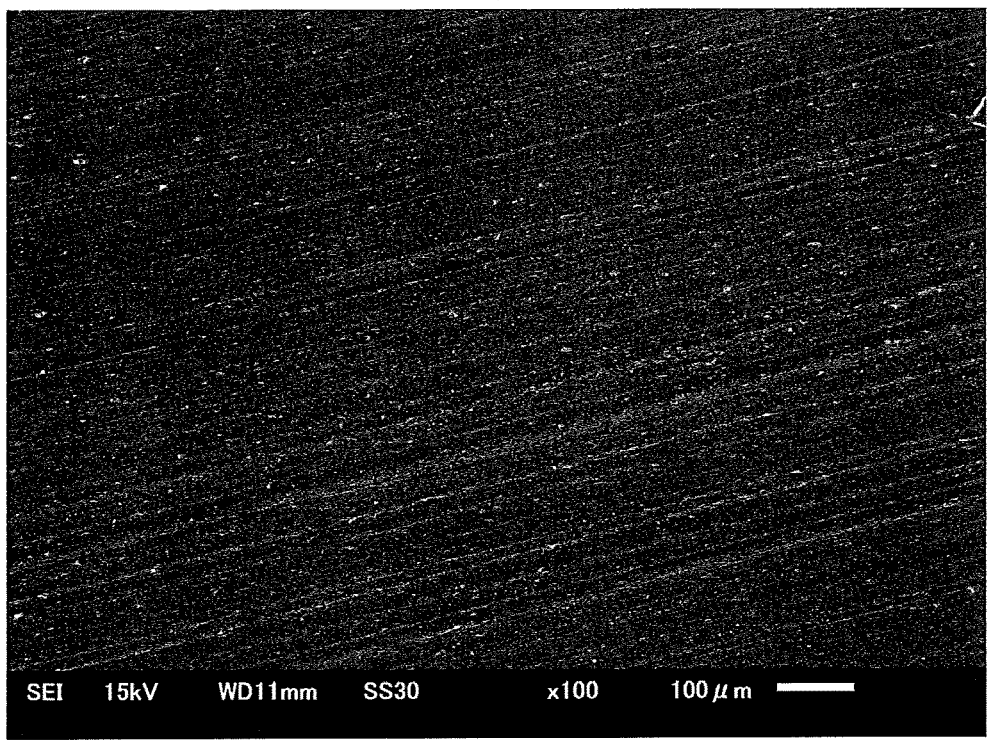
FIG. 10 shows a scanning electron micrograph taken in Example 9.
Figure 11:
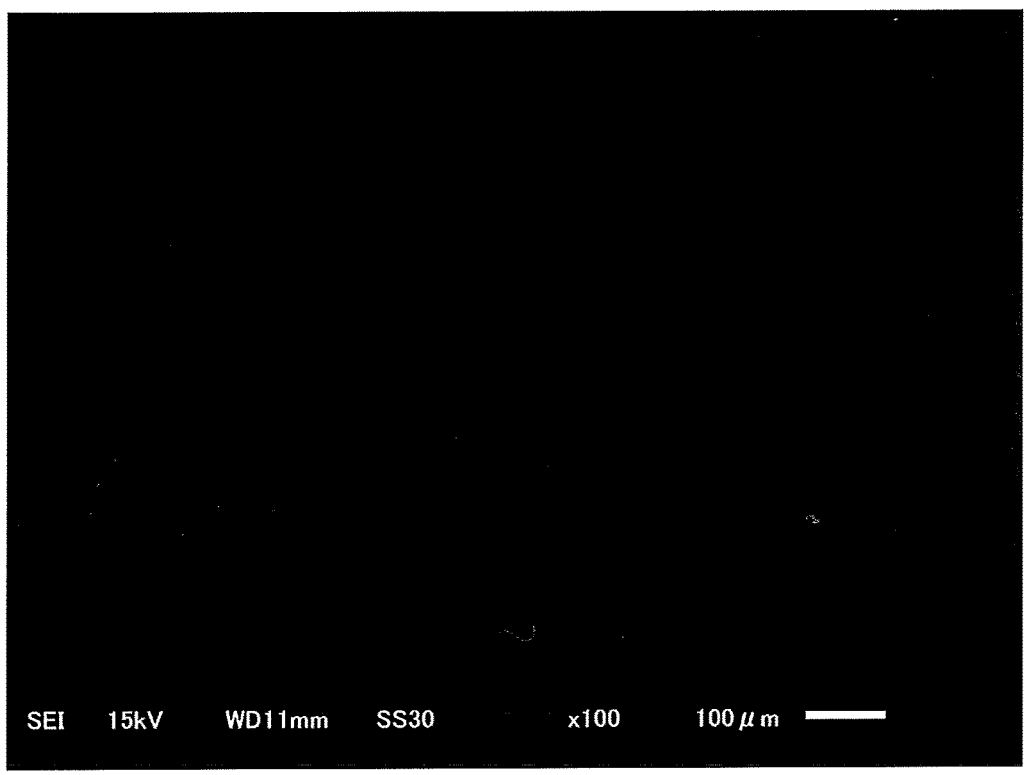
FIG. 11 shows a scanning electron micrograph taken in Comparative Example 2.
Figure 12:
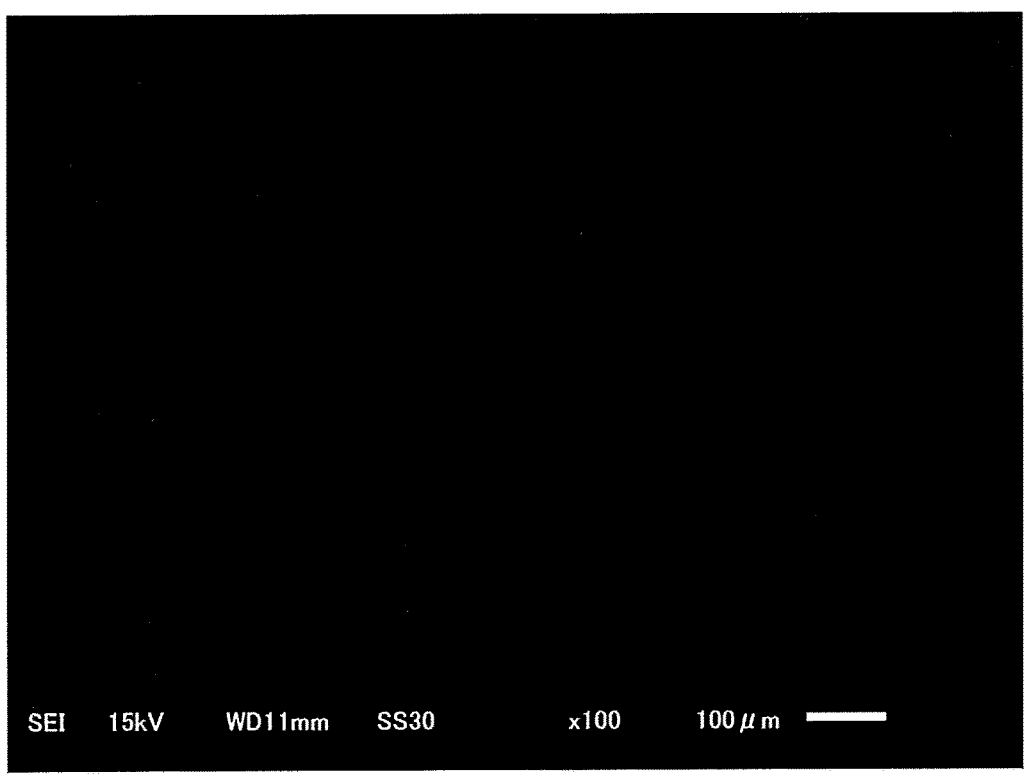
FIG. 12 shows a scanning electron micrograph taken in Comparative Example 3.
Figure 13:
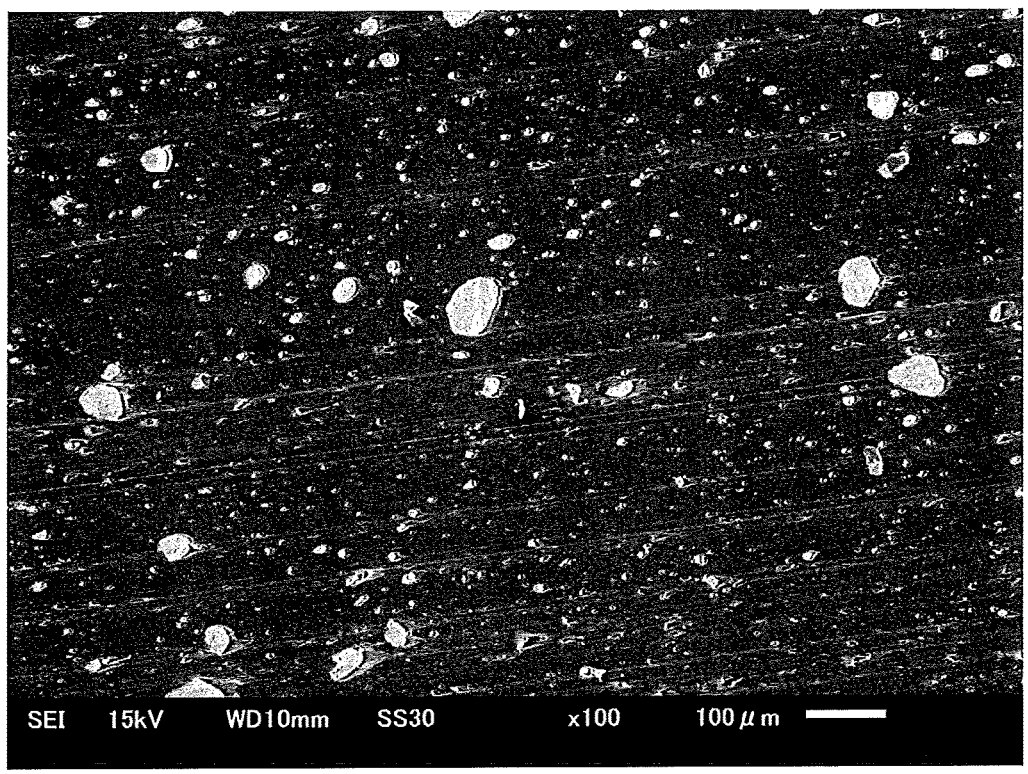
FIG. 13 shows a scanning electron micrograph taken in Comparative Example 4.
Figure 14:
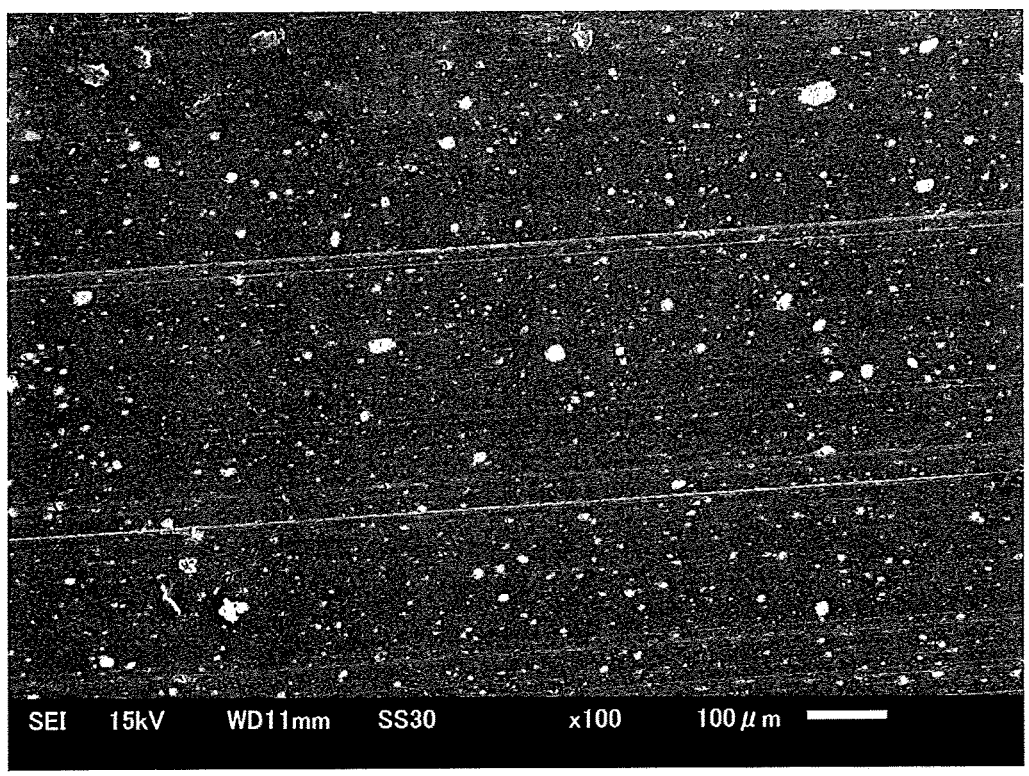
FIG. 14 shows a scanning electron micrograph taken in Comparative Example 5.
Figure 15:
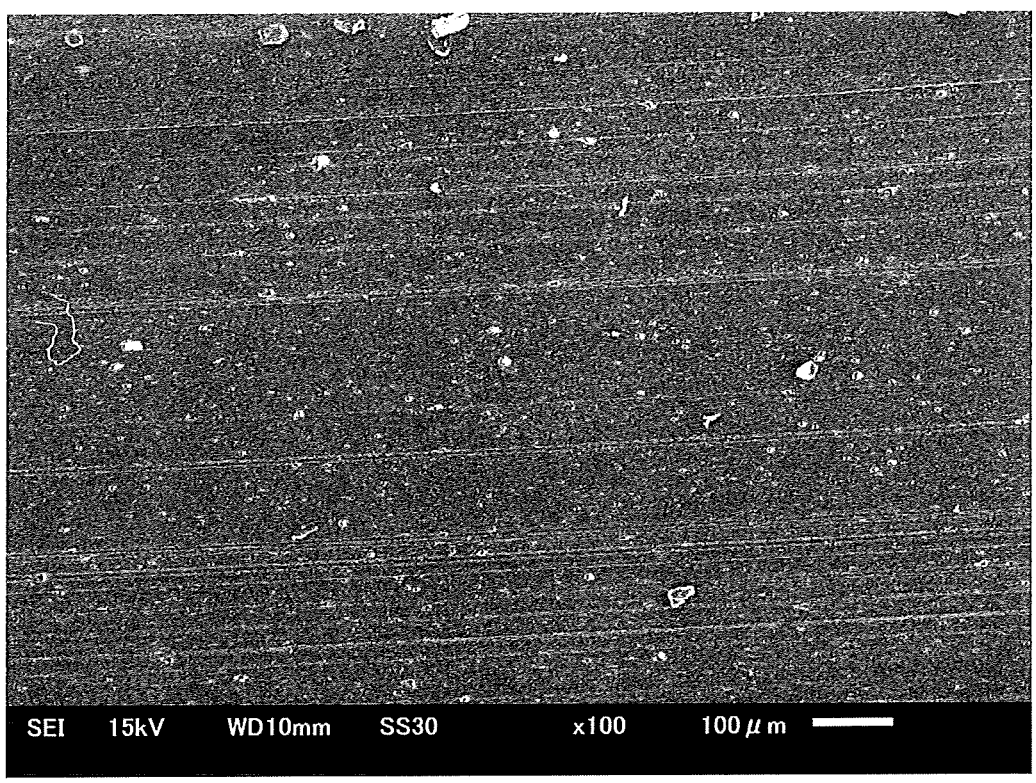
FIG. 15 shows a scanning electron micrograph taken in Comparative Example 6.

The physical properties of powder prepared in the examples and comparative examples were evaluated. Table 1 shows the results. The scanning electron micrographs taken for the above "7) Number of agglomerates with a size of 10 μm or more" are shown in FIGS. 1 to 15.

TABLE 1

| | Organic compound | Amount added in production Parts by weight [X1] | Number average primary particle size nm | Contact angle Degree | 10 μm particles number/ 1 mm² | Powder color L | a | b | W | Carbon amount % by weight | Fe content ppm | Bulk specific gravity g/cm³ | Spectral transmittance % |
|---|---|---|---|---|---|---|---|---|---|---|---|---|---|
| Comparative Example 1 | None | 0 | 50 | [X2] | 18 | 97.5 | −1.0 | 2.4 | 96.4 | 0.0 | 5 | 0.3 | 0.4 |
| Example 1 | Stearic acid | 4 | 50 | 134 | 0 | 98.0 | −0.9 | 2.5 | 96.7 | 2.6 | 7 | 0.32 | 5.6 |
| Example 2 | Stearic acid | 10 | 50 | 146 | 1 | 98.0 | −0.9 | 2.6 | 96.6 | 5.9 | 8 | — | — |
| Example 3 | Sodium stearate | 4 | 50 | 151 | 0 | 97.8 | −1.1 | 2.6 | 96.5 | 2.4 | 6 | — | — |
| Example 4 | Decyltrimethoxysilane | 4 | 50 | 93 | 0 | 97.6 | −0.8 | 1.7 | 97.0 | 1.8 | 9 | — | — |
| Example 5 | Isostearyl acid phosphate A-180L | 4 | 50 | 89 | 5 | 97.5 | −0.9 | 2.0 | 96.7 | 2.7 | 10 | — | — |
| Example 6 | Methyl hydrogen silicone | 4 | 50 | 131 | 2 | 98.2 | −0.8 | 2.3 | 97.0 | 0.6 | 8 | — | — |
| Example 7 | Dimethyl silicone | 4 | 50 | 28 | 6 | 97.8 | −1.0 | 2.2 | 96.7 | 1.2 | 9 | — | — |
| Example 8 | Diethanolamine Stearic acid | 2.5 5 | 50 | 134 | 0 | 97.4 | −0.6 | 1.2 | 97.1 | 4.8 | 7 | — | — |
| Example 9 | $Al_2O_3$ Stearic acid | 0.5 5 | 50 | 137 | 5 | 96.8 | −0.4 | 1.6 | 96.4 | 3.8 | 9 | — | — |
| Comparative Example 2 | BARIACE B-55 | Not added | 500 | [X2] | 0 | 99.0 | −0.3 | 1.3 | 98.4 | 0.0 | 2 | — | 0.2 |
| Comparative Example 3 | BARIACE B-30 | Not added | 200 | [X2] | 0 | 96.9 | −1.1 | 1.2 | 96.5 | 0.0 | 9 | — | — |
| Comparative Example 4 | Polyethylene glycol 2000 | 4 | 50 | [X2] | 61 | 96.4 | −1.5 | 3.9 | 94.5 | 0.4 | 11 | — | — |
| Comparative Example 5 | $SiO_2$ $Al_2O_3$ | 4 2 | 50 | [X2] | 58 | 95.3 | −1.4 | 2.5 | 94.5 | 0.0 | 12 | — | — |
| Comparative Example 6 | 1-Hydroxyethane-1,1-diphosphonic acid (monohydrate) | 5 | 50 | [X2] | 13 | 96.0 | −2.2 | 4.1 | 93.9 | 0.1 | 8 | — | — |

[X1] Amount (parts by weight) of organic compound per 100 parts by weight of barium sulfate substrate

[X2] Contact angle unmeasurable due to permeation

The followings were confirmed by the results of the examples and comparative examples.

Comparison of the barium sulfate powders (1) to (9) prepared respectively in Examples 1 to 9 with the barium sulfate powders (C1) and (C4) to (C6) prepared respectively in Comparative Examples 1 and 4 to 6 revealed the difference: all the barium sulfate powders (1) to (9) have a number average primary particle size of 1 to 100 nm, have an organic compound on the surface, and have a contact angle of 10 to 170 degrees, while the contact angle of the barium sulfate powders (C1) and (C4) to (C6) was unmeasurable (due to permeation) though the powders have a number average primary particle size in a range almost the same as that of the barium sulfate powders (1) to (9). Furthermore, the barium sulfate powder (C1) is different from the barium sulfate powders (1) to (9) in that it includes no organic compound on its surface. In addition to the above differences, the barium sulfate powders (1) to (9) are different from the barium sulfate powders (C1) and (C4) to (C6) in terms of the dispersibility in resins which was evaluated based on the number of agglomerates with a size of 10 μm or more visually recognizable in a resin molded article containing each powder; specifically, the number is significantly different, with 6 or less for the powders (1) to (9) and 13 or more for the powders (C1) and (C4) to (C6). The better dispersibility is also indicated by a higher transparency of the resin determined from the spectral transmittance. It is thus demonstrated that the features of the barium sulfate powder, i.e., the powder includes an organic compound on its surface; and the powder in the form of compressed compact has a contact angle with distilled water of 10 to 170 degrees, are important to cause the fine powder to exhibit the effect of easy and simple dispersion in resins or solvents.

The barium sulfate powder used in Comparative Example 2 or 3 has a relatively large number average primary particle size of 200 nm or more. Since such barium sulfate powder is highly dispersible in resins (and solvents) (see, FIGS. 11 and 12), it in the first place does not have the problem (dispersibility in resins or solvents) to be solved by the fine barium sulfate powder of the present invention.

The invention claimed is:

1. A barium sulfate powder
having a number average primary particle size of 1 to 100 nm,
the powder comprising an organic compound on its surface,
the powder in the form of a compressed compact having a contact angle with distilled water of 10 to 170 degrees, and
the powder having a bulk specific gravity of 0.6 g/cm$^3$ or less.

2. A resin composition comprising:
the barium sulfate powder according to claim 1; and
a resin.

3. The resin composition according to claim 2, wherein the resin is at least one thermoplastic resin selected from the group consisting of polyvinyl chloride, polyethylene resins, polyester resins, polyamide resins, and polyacrylic resins.

4. A coating composition or an ink composition comprising the resin composition according to claim 2.

5. A resin molded article comprising the resin composition according to claim 2.

6. The resin molded article according to claim 5, wherein the number of barium sulfate agglomerates with a size of 10 μm or more is not more than 10 in a field of view of 1 mm$^2$ of a scanning electron micrograph of the resin molded article.

7. The barium sulfate powder of claim 1, wherein the surface of the barium sulfate powder further comprises an organic compound having a C4 or shorter chain selected from the group consisting of trimethylolethane, trimethylolpropane, monomethanolamine, diethanolamine, or trimethanolamine.

8. The barium sulfate powder of claim 1, wherein the surface of the barium sulfate powder further comprises an inorganic compound selected from the group consisting of alumina, aluminum hydroxide, zinc oxide, silica, hydrous alumina, and hydrous silica.

9. The barium sulfate powder of claim 1, wherein the organic compound has a C4 or longer carbon chain and/or a siloxane bond.

10. A method for producing a barium sulfate powder, comprising:
adding an organic compound to a slurry containing a barium sulfate substrate having a number average primary particle size of 1 to 100 nm,
wherein the powder comprises an organic compound on its surface,
the powder in the form of a compressed compact has a contact angle with distilled water of 10 to 170 degrees, and
the powder has a bulk specific gravity of 0.6 g/cm$^3$ or less.

11. The method for producing barium sulfate powder according to claim 10,
wherein the amount of the organic compound is 2 to 20 parts by weight per 100 parts by weight of the barium sulfate substrate.

12. A method for producing barium sulfate powder, comprising:
adding an organic compound that has a C4 or longer carbon chain and/or a siloxane bond to a slurry having a temperature of 40° C. to 100° C. and containing a barium sulfate substrate having a number average primary particle size of 1 to 100 nm, wherein
the powder comprises an organic compound on its surface,
the powder is in the form of a compressed compact has a contact angle with distilled water of 10 to 170 degrees, and
the powder has a bulk specific gravity of 0.6 g/cm$^3$ or less.

13. The method for producing barium sulfate powder according to claim 12,
wherein the amount of the organic compound is 2 to 20 parts by weight per 100 parts by weight of the barium sulfate substrate.

* * * * *